US008634628B2

(12) United States Patent
Inoue (10) Patent No.: US 8,634,628 B2
(45) Date of Patent: Jan. 21, 2014

(54) MEDICAL IMAGE PROCESSING APPARATUS, METHOD AND PROGRAM

(71) Applicant: FUJIFILM Corporation, Tokyo (JP)

(72) Inventor: Tsutomu Inoue, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/725,786

(22) Filed: Dec. 21, 2012

(65) Prior Publication Data

US 2013/0108133 A1 May 2, 2013

Related U.S. Application Data

(63) Continuation of application No. PCT/JP2012/002536, filed on Apr. 12, 2012.

(30) Foreign Application Priority Data

Apr. 19, 2011 (JP) ................................. 2011-092723

(51) Int. Cl.
*G06T 7/00* (2006.01)

(52) U.S. Cl.
USPC ......................................................... 382/131

(58) Field of Classification Search
USPC ......................................................... 382/131
See application file for complete search history.

(56) References Cited

U.S. PATENT DOCUMENTS

| 2003/0099390 | A1 | 5/2003 | Zeng et al. | |
| 2011/0051885 | A1* | 3/2011 | Buelow et al. | .................... 378/4 |
| 2011/0135172 | A1 | 6/2011 | Kitamura | |

FOREIGN PATENT DOCUMENTS

| JP | 2009-211138 A | 9/2009 |
| JP | 2010-220742 A | 10/2010 |
| WO | WO 2009/128020 A1 | 10/2009 |

OTHER PUBLICATIONS

Automatic Segmentation of Pulmonary Artery (PA) in 3D Pulmonary CTA Images. Yousef Ebrahimdoost, Salah D. Qanadli, Alireza Nikravanshalmani, Tim J. Ellis, Zahra Falah Shojaee, and Jamshid Dehmeshki. 2011 IEEE.*
Y. Sato et al., "Three-dimensional multi-scale line filter for segmentation and visualization of curvilinear structures in medical images", Medical Image Analysis, vol. 2, No. 2, pp. 143-168, Jun. 1998.

(Continued)

*Primary Examiner* — Stephen R Koziol
*Assistant Examiner* — Delomia Gilliard
(74) *Attorney, Agent, or Firm* — McGinn IP Law Group, PLLC (57) ABSTRACT

A continuous-region-extraction unit extracts a continuous-region having a voxel value corresponding to an air-region in bronchi from a three-dimensional-medical-image. A tree-structure-construction unit constructs a tree-structure corresponding to the continuous-region. A linear-structure-extraction unit extracts plural linear-structures representing fragments of small-bronchi by analyzing a local density structure in a neighborhood of each point in the three-dimensional-medical-image. A tree-structure-reconstruction unit reconstructs a graph-structure representing the whole bronchi by connecting a node constituting the graph-structure of large-bronchi and a node representing the linear-structures of small-bronchi. At this time, different cost functions are used for a segment connecting the node of the large-bronchi and the node representing the linear-structures of the small-bronchi and a segment connecting the nodes representing the linear-structures to each other. The cost function in the former segment is defined in such a manner that the segment is more likely to be connected as a change in voxel values is smaller.

8 Claims, 6 Drawing Sheets

(56) References Cited

OTHER PUBLICATIONS

Y. Kawata et al., "Processing Algorithms for 3D Blood Vessels Images Using Cone-Beam CT", Transactions of the Institute of Electronics, Information and Communication Engineers D-II, vol. J79-D-II, No. 6, pp. 1134-1145, Jun. 1996.

H. Shikata and S. Kido, "An algorithm for extracting pulmonary vascular trees from 3D X-ray CT images of a set of patients with interstitial diseases", Technical Report of the Institute of Electronics, Information and Communication Engineers, vol. 104, No. 580, pp. 31-36, Jan. 2005.

* cited by examiner

MEDICAL IMAGE PROCESSING APPARATUS, METHOD AND PROGRAM

BACKGROUND OF THE INVENTION

1. Field of the Invention

The present invention relates to a technique for constructing a graph structure representing a tubular structure in a three-dimensional medical image.

2. Description of the Related Art

Lung cancers are a disease in which a survival rate sharply drops as the stage of the disease progresses. Therefore, early detection and early treatment of lung cancers are extremely important. For example, when a shadow of a suspicious tumor or the like is found in a simple X-ray image of a chest, a CT image or the like, precise examinations are necessary to judge whether the suspicious tumor is a tumor. If the suspicious tumor is a tumor, it is necessary to judge whether the tumor is benign or malignant. In judging whether the tumor is benign or malignant, a pathology examination is performed by removing a part of the tumor by a bronchial endoscope. In this examination, it is important to more speedily and more accurately move the endoscope to the position of the tumor. For that purpose, it is effective to recognize the shape (a branching pattern or the like) of bronchi and a path to the tumor by using a CT image obtained by imaging before the examination.

Here, a technique using a Hessian matrix has been proposed, as an image recognition technique for extracting linear structures, such as bronchi, from a three-dimensional medical image obtained by CT, or the like. Specifically, first, multi-resolution transformation is performed on the three-dimensional medical image. After then, eigenvalue analysis of Hessian matrix is performed on the image of each resolution to extract a linear structure element. The linear structure element has a characteristic that only one of three eigenvalues obtained by eigenvalue analysis is close to 0. Next, linear structure elements (blood vessels) in various sizes are extracted from the three-dimensional medical image by combining results of analyzing images of respective resolutions. Further, data of a tree structure representing tubular structures in the three-dimensional medical image are obtained by connecting the extracted linear structure elements to each other by using a minimum spanning tree algorithm. When the linear structure elements are connected to each other by the minimum spanning tree algorithm, a cost function based on a positional relationship between linear structure elements or the principal axis direction of each linear structure element represented by an eigenvector corresponding to the aforementioned eigenvalue close to 0 is used (Japanese Unexamined Patent Publication No. 2010-220742 (Patent Document 1).

Meanwhile, bronchi have a tree structure in which a diameter gradually becomes smaller from 20 mm or larger to 0.5 mm or less while repeating branching from a trachea, and exhibit different anatomical and image characteristics depending on the diameter. Specifically, first, the angle of branching is different. The angle of branching may be an obtuse angle at a large diameter portion of the bronchi, but the angle of branching is an acute angle at a small diameter portion of the bronchi. Second, the bronchi are interrupted. Specifically, the bronchi in an image are not interrupted at a large diameter portion of the bronchi as long as a stenosis caused by a disease or the like is not present. However, at a small diameter portion of the bronchi, the bronchi in the image may be represented as if the bronchi are interrupted because of a noise in the image, which is caused by a partial volume effect and a motion artifact of a heart. Third, the thickness of the wall of the bronchi is different. Specifically, since the wall of the bronchi is thick at a large diameter portion of the bronchi, a difference in CT values between the wall of the bronchi and an air region in the bronchi is prominent. However, since the wall of the bronchi is thin at a small diameter portion of the bronchi, a difference in CT values between the wall of the bronchi and the air region in the bronchi is small, and a boundary between the wall and the air region is vague.

When bronchi are extracted by using the technique disclosed in Patent Document 1, a minimum spanning tree algorithm is executed by using a cost function in which the principal axis direction of each linear structure element is considered. Therefore, even if an interruption in an image is present, or a difference between the wall of the bronchi and the air region in the image is small at a small diameter portion of the bronchi, it is possible to correctly connect each of the linear structure elements. However, in a part of the bronchi in which the diameter is large and the angle of branching is an obtuse angle, a difference between principal axis directions of neighboring linear structure elements is large. Therefore, there is a risk that the linear structure elements are not correctly connected to each other.

SUMMARY OF THE INVENTION

In view of the foregoing circumstances, it is an object of the present invention to provide a medical image processing apparatus, method and program that can construct a more accurate graph structure of bronchi in a three-dimensional medical image.

A medical image processing apparatus of the present invention is a medical image processing apparatus comprising:

a continuous region extraction means that receives a three-dimensional medical image representing bronchi, and that extracts a continuous region having a voxel value corresponding to an air region in the bronchi;

a graph structure construction means that constructs a graph structure corresponding to the continuous region;

a linear structure extraction means that extracts a plurality of linear structures representing fragments of the bronchi by receiving the three-dimensional medical image, and by analyzing a local density structure in a neighborhood of each point in the three-dimensional medical image; and a graph structure reconstruction means that reconstructs a graph structure representing the bronchi by connecting a node constituting the graph structure corresponding to the continuous region and a node representing the linear structures to each other, and nodes representing the linear structures to each other by using a predetermined cost function, wherein different cost functions are defined for a first segment connecting the node constituting the graph structure corresponding to the continuous region and the node representing the linear structures and a second segment connecting the nodes representing the linear structures to each other, and wherein the cost function in the first segment is defined in such a manner that the first segment is more likely to be connected as a change in voxel values is smaller among first segments.

A medical image processing method of the present invention is a medical image processing method comprising the steps of:

receiving a three-dimensional medical image representing bronchi, and extracting a continuous region having a voxel value corresponding to an air region in the bronchi;

constructing a graph structure corresponding to the continuous region;

extracting a plurality of linear structures representing fragments of the bronchi by receiving the three-dimensional medical image, and by analyzing a local density structure in a neighborhood of each point in the three-dimensional medical image; and reconstructing a graph structure representing the bronchi by connecting a node constituting the graph structure corresponding to the continuous region and a node representing the linear structures to each other, and nodes representing the linear structures to each other by using a predetermined cost function wherein different cost functions are defined for a first segment connecting the node constituting the graph structure corresponding to the continuous region and the node representing the linear structures and a second segment connecting the nodes representing the linear structures to each other, and wherein the cost function in the first segment is defined in such a manner that the first segment is more likely to be connected as a change in voxel values is smaller among first segments.

A medical image processing program of the present invention is a program for causing a computer to execute the medical image processing method.

In the present invention, when a linear structure is extracted, the principal axis direction of the linear structure may be calculated, and the cost function in the second segment may be defined in such a manner that the second segment is more likely to be connected as a change in the principal axis directions at nodes located at both ends of the second segment is smaller.

Further, a plurality of images having different resolutions from each other may be generated from the three-dimensional medical image. Then, a lower resolution image of the generated plurality of images may be received, and the continuous region may be extracted from the lower resolution image. Further, a higher resolution image of the generated plurality of images may be received, and extraction of the linear structure and calculation of the principal axis direction may be performed on the higher resolution image.

In the present invention, when a continuous region having a voxel value corresponding to an air region in the bronchi is extracted, the continuous region may be extracted by connecting neighboring voxels the voxel values of which are close to each other in such an extent to satisfy a predetermined condition. As a specific example, a graph-cut method, a region growing method, a level set method, or the like may be used.

Further, eigenvalue analysis of Hessian matrix may be used to extract a linear structure and to calculate a principal axis direction.

Further, a minimum spanning tree algorithm may be used to construct a graph structure.

According to the present invention, it is possible to construct a highly accurate graph structure representing bronchi in a three-dimensional medical image by combining two extraction methods appropriate for anatomical and image characteristics of a large diameter portion of the bronchi and a small diameter portion of the bronchi, respectively.

Specifically, first, a continuous region representing the inside of bronchi is extracted from a three-dimensional medical image. As described above, a large diameter portion of the bronchi in the image is represented, as a region without interruption. Therefore, even if a point branching at an obtuse angle is present, the continuous region of the bronchi is extracted at high accuracy. Therefore, a graph structure generated based on the continuous region represents the bronchi also at high accuracy.

Second, plural linear structures representing fragments of bronchi are extracted by analyzing a local density structure in a neighborhood of each point in the three-dimensional medical image. As described above, a small diameter portion of the bronchi in the image may be interrupted. However, since this second extraction technique can handle the bronchi as a set of fragmentary linear structures, highly accurate extraction is possible.

Further, different cost functions are used for a first segment connecting the node constituting the graph structure representing the continuous region of the bronchi and the node representing the linear structures representing fragments of the bronchi and a second segment connecting the nodes representing the linear structures representing fragments of the bronchi to each other. Further, the cost function in the first segment is defined in such a manner that the first segment is more likely to be connected as a change in voxel values is smaller among first segments. Further, a graph structure of the bronchi is reconstructed by using this cost function. Therefore, it is possible to appropriately connect a large diameter portion of the bronchi extracted by using the first extraction method and a small diameter portion of the bronchi extracted by using the second extraction method.

Accordingly, a graph structure of bronchi in a three-dimensional medical image is constructed, at higher accuracy.

DESCRIPTION OF THE PREFERRED
EMBODIMENTS

Hereinafter, a medical image diagnosis system to which a medical image processing apparatus according to an embodiment of the present invention has been introduced will be described.

Figure 1:
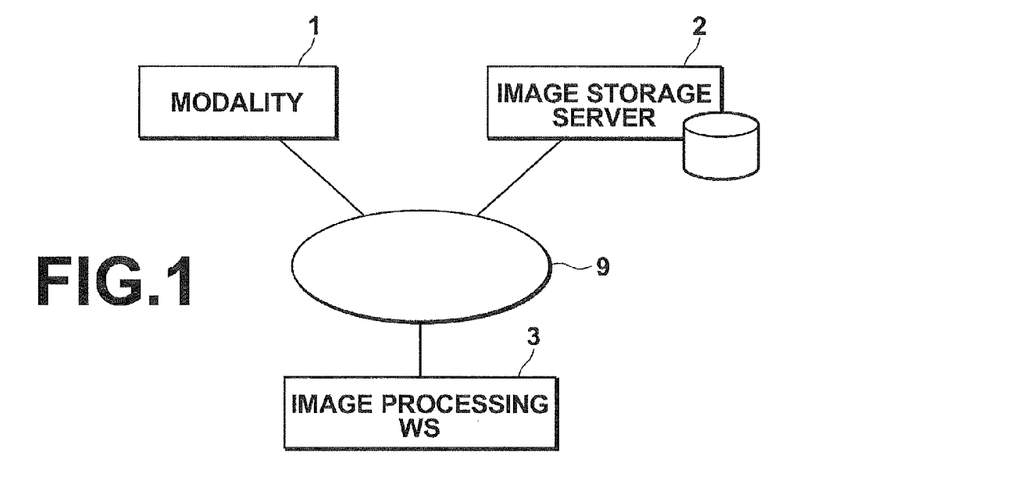
FIG. 1 is a schematic diagram illustrating the configuration of a medical image diagnosis system to which a medical image processing apparatus according to an embodiment of the present invention has been introduced.

FIG. 1 is a schematic diagram illustrating the hardware configuration of this medical image diagnosis system. In this system, a modality 1, an image storage server 2, and an image processing workstation 3 are connected to each other through a network 9 in such a manner that they can communicate with each other, as illustrated in FIG. 1.

The modality 1 includes an apparatus that generates image data of a three-dimensional medical image representing an examination target region of a subject to be examined by imaging the region. The apparatus attaches supplementary information defined by DICOM (Digital Imaging and Communications in Medicine) standard to the image data, and outputs the image data, as image information. In the present embodiment, a CT is used as the modality 1, and a case in which three-dimensional image data are generated by scanning the chest of a human body, which is a subject to be examined, in the direction of the body axis by the CT will be described.

The image storage server 2 is a computer that stores, in an image database, medical image data obtained by the modality 1 and image data of medical images generated by image processing at the image processing workstation 3, and that manages the data. The image storage server 2 includes a large capacity external storage device, software for database management (for example, ORDB (Object Relational Database) management software). The image storage server 2 searches the image database based on a search request from the image processing workstation 3, and sends extracted image data to the image processing workstation 3.

The image processing workstation 3 is a computer that performs image processing (including image analysis) on medical image data obtained from the modality 1 and the image storage server 2 based on a request from a radiologist who performs image reading, and displays a generated image. The image processing workstation 3 includes known hardware elements, such as a CPU, a main storage device, an auxiliary storage device, an input output interface, a communication interface, an input device (a mouse, a keyboard, or the like), a display device (a display monitor), and a data bus. Further, a known operating system, a medical image processing program, which will be described later, or the like has been installed in the image processing workstation 3. Medical image processing performed at the image processing workstation 3 is realized by executing a medical image processing program installed from a recording medium, such as a CD-ROM. This program may be downloaded from a storage device of a server connected through a network, such as the Internet, and installed.

The storage format of image data and communication between devices through the network 9 are based on a protocol, such as DICOM.

In the present embodiment, a simulation and navigation function for a surgery or an endoscopic examination of bronchi or lungs is packaged in the image processing workstation 3. In this function, after bronchi are automatically extracted from a three-dimensional medical image of a chest obtained by CT, virtual endoscope images of the bronchi are generated along an insertion path of a real endoscope, and sequentially displayed. Medical image processing of the present invention for constructing a graph structure (hereinafter, a tree structure is used as an example) representing the bronchi is packaged as processing for automatically extracting the bronchi. In other words, the image processing workstation 3 functions as a medical image processing apparatus of the present invention.

Figure 2:
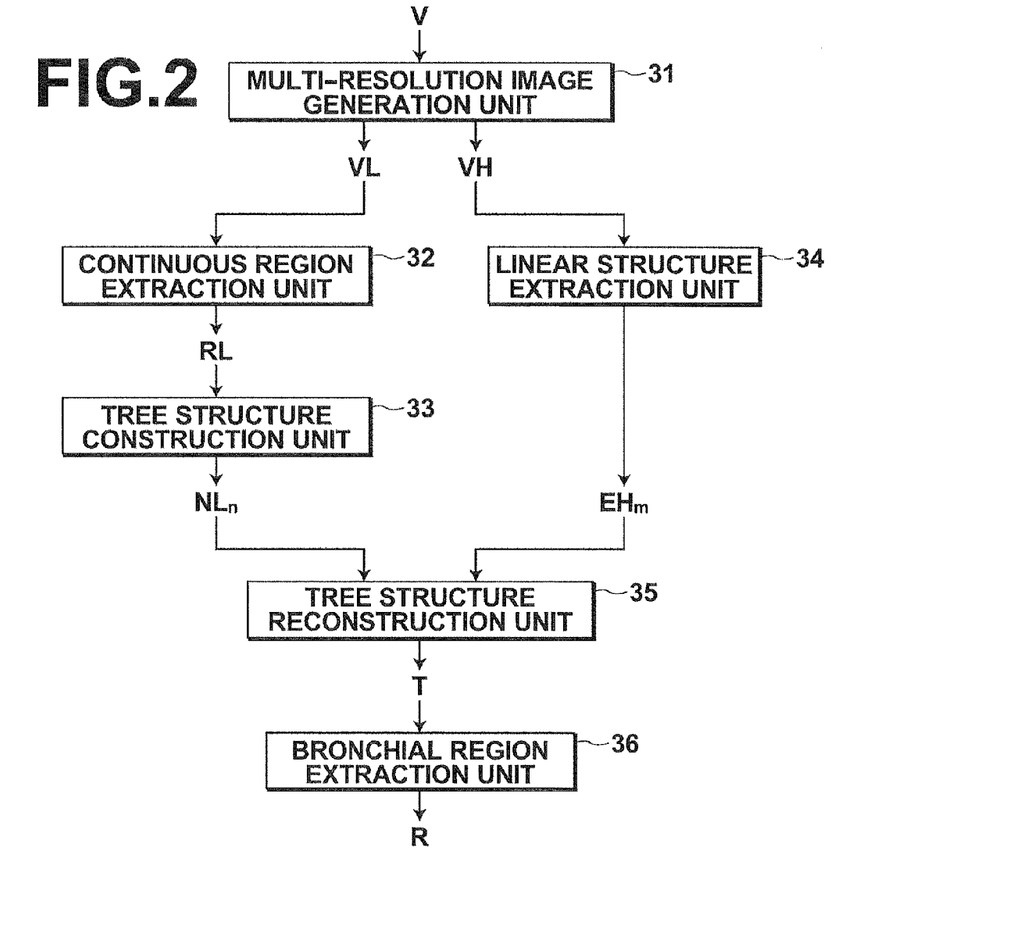
FIG. 2 is a schematic block diagram illustrating elements and a flow of processing for realizing a medical image processing function in an embodiment of the present invention.

FIG. 2 is a schematic diagram illustrating processing blocks related to bronchial region extraction processing according to an embodiment of the present invention among functions of the image processing workstation 3, and a flow of data and processing. The medical image processing of the present invention is also included in this bronchial region extraction processing. As illustrated in FIG. 2, the bronchial region extraction processing in the present embodiment is realized by a multi-resolution image generation unit 31, a continuous region extraction unit 32, a tree structure construction unit 33, a linear structure extraction unit 34, a tree structure reconstruction unit 35, and a bronchial region extraction unit 36. Further, three-dimensional medical image V, low resolution component (hereinafter, a low resolution image) VL of the three-dimensional medical image V, high resolution component (hereinafter, a high resolution image) VH of the three-dimensional medical image V, continuous region RL of large bronchi, node information $NL_n$ (n is a subindex for distinguishing each node) of a tree structure of large bronchi, linear structure $EH_m$ (m is a subindex for distinguishing each linear structure) of small bronchi, tree structure T of the whole bronchi, and bronchial region R are data read from or written in predetermined memory areas of the image processing workstation 3 by each of the aforementioned processing units.

Next, the content of processing performed by each of the aforementioned processing units will be summarized along a flow of bronchi extraction processing in the present embodiment.

First, three-dimensional medical image V, which is data input to the multi-resolution image generation unit 31, is imaged by the modality 1 (CT), and stored in the image storage server 2. The three-dimensional medical image V is extracted by database search by the image storage server 2 based on a search request from the image processing workstation 3, and sent to the image processing workstation 3. The multi-resolution image generation unit 31 reads this three-dimensional medical image V from a memory area, and performs multi-resolution transformation to generate low resolution image VL and high resolution image VH. The low resolution image VL and the high resolution image VH are stored in a predetermined memory area.

The continuous region extraction unit 32 reads the low resolution image VL from the memory area, and extracts continuous region RL having a voxel value corresponding to an air region in the bronchi. The continuous region RL is stored in a predetermined memory area. Here, the continuous region RL is a region representing the bronchi extracted from the low resolution image VL. Therefore, the continuous region RL represents a portion of the bronchi having a larger diameter than that of a region representing the bronchi extracted from the high resolution image VH, which will be described later.

The tree structure construction unit 33 reads the continuous region RL representing large bronchi from the memory area, and constructs a tree structure representing the large bronchi. The tree structure construction unit 33 stores node information $NL_n$ of the tree structure in a predetermined memory area.

Meanwhile, the linear structure extraction unit 34 reads high resolution image VH from the memory area, and extracts plural linear structures $EH_m$ representing fragments of small bronchi from the high resolution image VH by analyzing a local density structure in a neighborhood of each point in the high resolution image VH. The linear structure extraction unit 34 stores the plural linear structures $EH_m$ in a predetermined memory area.

The tree structure reconstruction unit 35 reads information $NL_n$ about each node of the tree structure representing large bronchi and each linear structure $EH_m$ representing small bronchi from the memory area. The tree structure reconstruction unit 35 reconstructs a tree structure representing the bronchi by connecting node $NL_n$ of a tree structure representing large bronchi and node $EH_m$ representing a linear structure of small bronchi to each other, and nodes $EH_m$ representing a linear structure of small bronchi to each other by using a predetermined cost function, which will be described later. The tree structure reconstruction unit 35 stores tree structure data T in a predetermined memory area.

The bronchial region extraction unit 36 reads the tree structure data T from the memory area, and extracts whole bronchial region R. The bronchial region extraction unit 36 stores the whole bronchial region R in a predetermined memory area.

Next, each processing unit will be described in detail.

Figure 6:
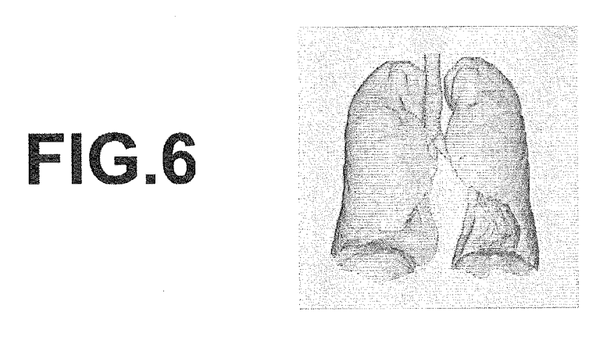
FIG. 6 is a schematic diagram illustrating a lung field region.

The multi-resolution image generation unit 31 generates a Gaussian pyramid by performing known multi-resolution transformation processing on three-dimensional medical image V. Images generated by this processing are low resolution image VL and high resolution image VH. Three or more images may be generated. In such a case, the generated images should be classified into a low resolution image group and a high resolution image group based on a standard, such as a resolution, which has been set in advance. Here, threshold processing based on a CT value corresponding to each component of a human body and labeling processing may be performed as preprocessing before performing multi-resolution transformation processing. A connected region representing the outside of the human body, which is a subject to be examined, soft tissue in the body surface, bones and the like may be deleted by the preprocessing to extract a lung field region, which remains after the preprocessing. FIG. 6 is a schematic diagram illustrating a lung field region, which is a target of the following processing. Some other known techniques may be used to extract the lung field region.

Figure 3:
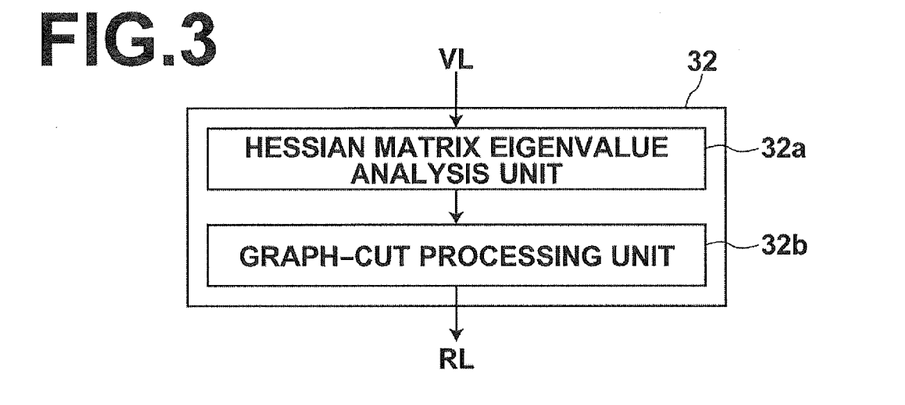
FIG. 3 is a block diagram illustrating the configuration of a continuous region extraction unit in detail.

As illustrated in FIG. 3, the continuous region extraction unit 32 includes a Hessian matrix eigenvalue analysis unit 32a and a graph-cut processing unit 32b.

Figure 7A:
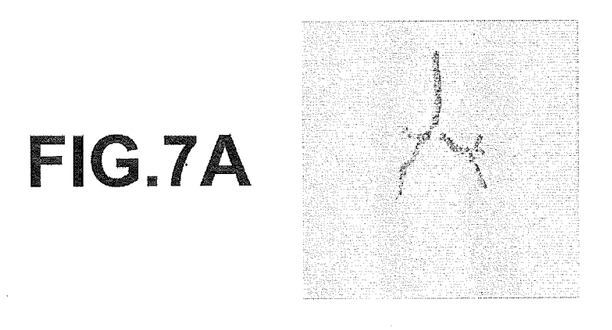
FIG. 7A is a schematic diagram illustrating a set of linear structures representing large bronchi.
Figure 7B:
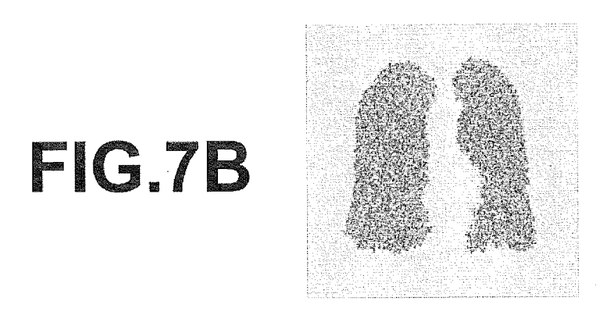
FIG. 7B is a schematic diagram illustrating the lung field region from which the set of linear structures representing the large bronchi have been excluded.

First, the Hessian matrix eigenvalue analysis unit 32a extracts a linear structure representing bronchi by performing eigenvalue analysis of Hessian matrix. FIG. 7A is a schematic diagram illustrating a set of extracted linear structures of bronchi. FIG. 7B is a schematic diagram illustrating a part of the lung field region illustrated in FIG. 6, and the part excluding the set of linear structures of bronchi illustrated in FIG. 7A.

Here, the Hessian matrix is a matrix composed of second order partial differential coefficients. The Hessian matrix is a 3×3 matrix for a three-dimensional image, as follows:

$$\nabla^2 I = \begin{bmatrix} I_{xx} & I_{xy} & I_{xz} \\ I_{yx} & I_{yy} & I_{yz} \\ I_{zx} & I_{zy} & I_{zz} \end{bmatrix}$$ [Formula 1]

-continued
$$I_{xx} = \frac{\delta^2 I}{\delta x^2},$$
$$I_{xy} = \frac{\delta^2 I}{\delta x \delta y^2},$$

When the following Gaussian kernel (f) function is used, filter coefficients for obtaining the Hessian matrix are obtained as follows. In this case, σ corresponding to the size of a linear structure to be detected is used.

$$f = \exp\left(-\frac{x^2 + y^2 + z^2}{2\sigma^2}\right)$$ [Formula 2]

$$\frac{\delta^2 f}{\delta x^2} = \left(\frac{x^2}{\sigma^4} - \frac{1}{\sigma^2}\right)$$

$$\frac{\delta^2 f}{\delta x \delta y} = \left(\frac{xy}{\sigma^4}\right) \times f$$

Three eigenvalues $\lambda_0, \lambda_1, \lambda_2$ of this Hessian matrix exhibit a characteristic that two of the three eigenvalues are large and the remaining one eigenvalue is close to 0 at a point representing a linear structure in the image, as follows:

$$\lambda_0 \approx 0$$

$$\lambda_1 \gg 0$$

$$\lambda_2 \gg 0$$ [Formula 3]

Therefore, it is possible to extract, as a linear structure, points at which three eigenvalues of Hessian matrix have the aforementioned characteristic from points in low resolution image VL.

When the multi-resolution image generation unit 31 generates images at three or more resolutions, eigenvalue analysis of Hessian matrix is performed on each of plural low resolution images belonging to a low resolution image group. At this time, even if σ corresponds to one kind of filter size, it is possible to extract plural sizes of linear structure, because the resolutions of processing target images are different. Finally, it is possible to extract various sizes of linear structure in the low-resolution image group by combining analysis results of images at respective resolutions (please refer to Y. Sato et al., "Three-dimensional multi-scale line filter for segmentation and visualization of curvilinear structures in medical images", Medical Image Analysis, Vol. 2, No. 2, pp. 143-168, June 1998, and the like).

Figure 7C:
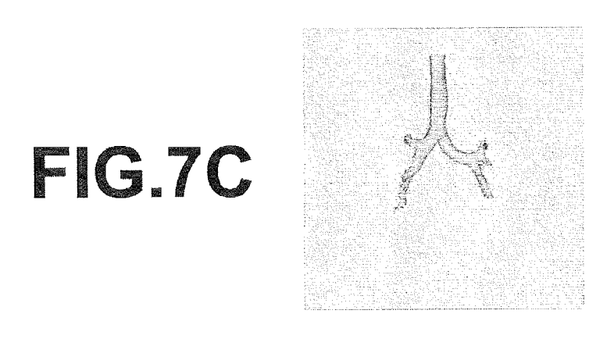
FIG. 7C is a schematic diagram illustrating a continuous region representing large bronchi.

Next, the graph-cut processing unit 32b extracts continuous region RL representing large bronchi, and which is a region of a set of points representing extracted linear structures (please refer to FIG. 7A) by using a known graph-cut method (please refer, for example, to Japanese Unexamined Patent Publication No. 2009-211138, and the like). The graph-cut processing unit 32b extracts the continuous region RL by dividing the set of points representing extracted linear structures and a set of points (please refer to FIG. 7B) other the set of points representing the extracted linear structures into an extraction target region to which the former points belong and a background region to which the latter points belong. FIG. 7C is a schematic diagram illustrating the extracted continuous region RL representing large bronchi.

The continuous region extraction unit 32 may extract continuous region RL representing large bronchi by using some other known techniques, such as a region growing method and a level set method, as long as a continuous region having a voxel value corresponding to an air region in the bronchi is extracted (particularly, a technique of connecting neighboring voxels the voxel values of which are close to each other in such an extent to satisfy a predetermined condition).

Figure 4:
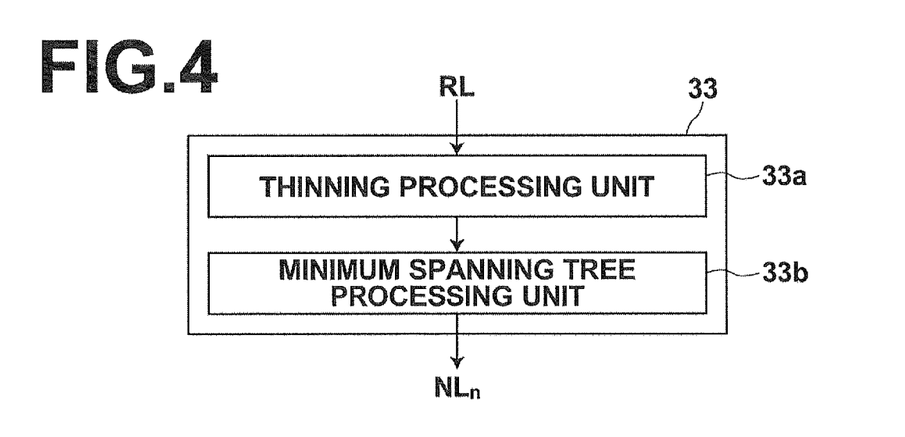
FIG. 4 is a block diagram illustrating the configuration of a tree structure construction unit in detail.

As illustrated in FIG. 4, the tree structure construction unit 33 includes a thinning processing unit 33a and a minimum spanning tree processing unit 33b.

Figure 8:
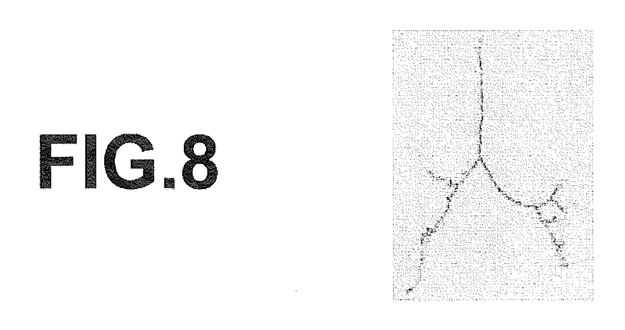
FIG. 8 is a schematic diagram illustrating a manner of thinning the continuous region representing the large bronchi.

First, the thinning processing unit 33a performs three-dimensional thinning processing on the continuous region RL representing large bronchi (for details, please refer, for example, to Y. Kawata et al., "Processing Algorithms for 3D Blood Vessels Images Using Cone-Beam CT", Transactions of the Institute of Electronics, Information and Communication Engineers D-II, Vol. J79-D-II, No. 6, pp. 1134-1145, June 1996, and the like). FIG. 8 is a schematic diagram illustrating a continuous region representing thinned large bronchi.

Next, the minimum spanning tree processing unit 33b sets, as a node point, each voxel obtained by thinning the continuous region, and determines one of these node points that is closest to the trachea, as a root of the tree structure. The point closest to the trachea may be determined by using a classifier obtained by known machine learning, or the like. Alternatively, a point in the thinned continuous region, and the point being closest to the head in the body axis direction, may be determined as the point closest to the trachea, or the point closest to the trachea may be specified by a manual operation by a user.

Further, the minimum spanning tree processing unit 33b calculates a cost for connecting each node point based on position information about plural node points, in other words, a distance between node points. Further, the minimum spanning tree processing unit 33b generates tree structure data $NL_n$ representing large bronchi by connecting the node points by using a minimum spanning tree algorithm.

The tree structure construction unit 33 may construct a tree structure by searching the thinned continuous region from the determined root toward the neighborhood of the root.

Figure 5:
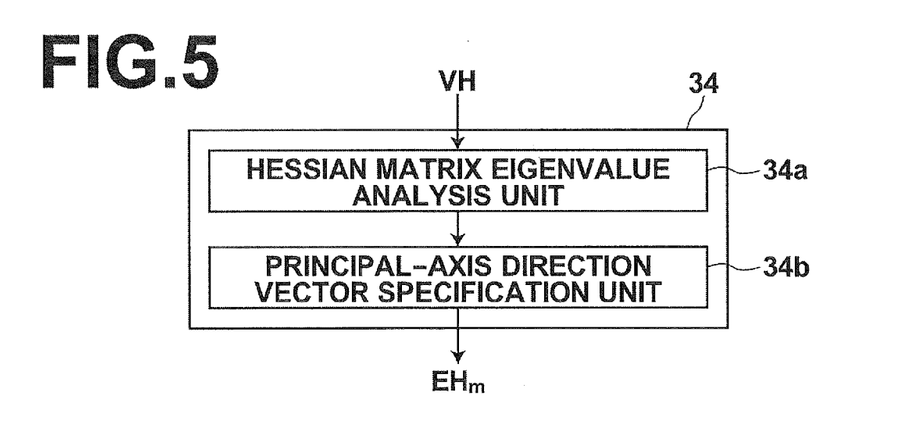
FIG. 5 is a block diagram illustrating the configuration of a linear structure extraction unit in detail.

As illustrated in FIG. 5, the linear structure extraction unit 34 includes a Hessian matrix eigenvalue analysis unit 34a and a principal axis direction vector specification unit 34b.

Figure 9:
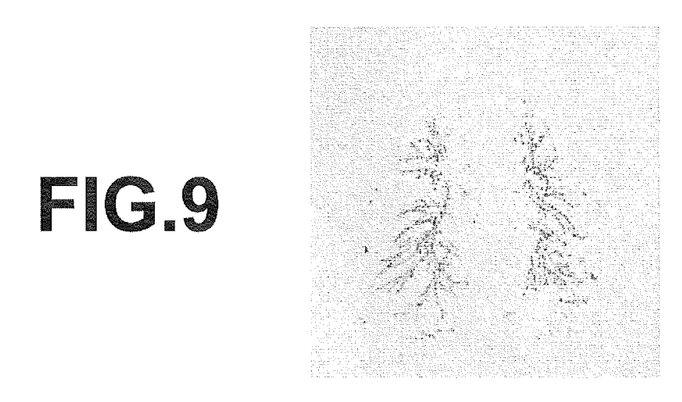
FIG. 9 is a schematic diagram illustrating a set of linear structures representing small bronchi.

First, the Hessian matrix eigenvalue analysis unit 34a analyzes a local density structure in a neighborhood of each point in the high resolution image VH by performing eigenvalue analysis of Hessian matrix in a manner similar to the Hessian matrix eigenvalue analysis unit 32a in the continuous region extraction unit 32. Accordingly, the Hessian matrix eigenvalue analysis unit 34a extracts linear structure $EH_m$ representing small bronchi. FIG. 9 is a schematic diagram illustrating the extracted linear structure $EH_m$. Here, even if the filter size used in the Hessian matrix eigenvalue analysis unit 34a is the same as the filter size used in the Hessian matrix eigenvalue analysis unit 32a, it is possible to extract a linear structure representing a smaller bronchi from the high resolution image VH than the case of low resolution image VL, because the resolutions of the processing target images are different from each other. Further, the Hessian matrix eigenvalue analysis unit 34a does not extract linear structure $EH_m$ from the continuous region RL extracted by the continuous region extraction unit 32 to prevent extraction of bronchi (a continuous region, a linear structure) from the same region in three-dimensional medical image V by both of the continuous region extraction unit 32 and the linear structure extraction unit 34.

Figure 10:
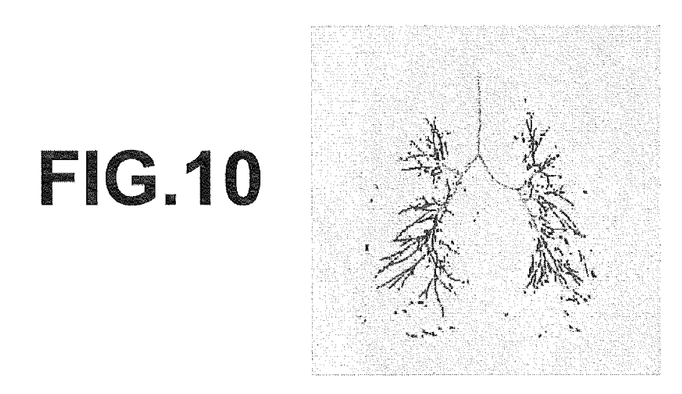
FIG. 10 is a schematic diagram illustrating a set of node points representing large bronchi and a set of node points representing small bronchi in combination.

The tree structure reconstruction unit 35 uses each node point $NL_n$ of tree structure data representing large bronchi, and the tree structure data having been constructed from low resolution image VL, and node point $EH_m$ representing a linear structure extracted from high resolution image VH. The tree structure reconstruction unit 35 connects node point $NL_n$ representing large bronchi and node point $EH_m$ representing small bronchi to each other by using a minimum spanning tree algorithm. Accordingly, the tree structure reconstruction unit 35 reconstructs tree structure data T representing the whole bronchi. FIG. 10 is a schematic diagram illustrating node points $NL_n$ representing large bronchi illustrated in FIG. 8 and node points $EH_m$ representing small bronchi illustrated in FIG. 9 in combination. Tree structure data T representing the whole bronchi is reconstructed by connecting each point illustrated in FIG. 10.

First, the tree structure reconstruction unit 35 calculates cost $\theta_{i,i+1}$ (i, i+1) between nodes by using at least one of plural characteristics at node point $P_i$ and node points $P_{i-1}$, $P_{i+1}$, which are before and after the node point $P_i$. Here, node points $P_{i-1}$, $P_i$, $P_{i+1}$ are represented without distinguishing node point $NL_n$ representing large bronchi and node point $EH_m$ representing small bronchi from each other. Next, four specific examples of cost calculation methods will be described.

A first specific example is a method for calculating a cost representing a positional relationship between two node points to be connected to each other. Specifically, the cost is calculated based on distance $D_{Pi,Pi+1}$ between node point $P_i$ and node point $P_{i+1}$ by using the following formula. This method is used also when the minimum spanning tree processing unit 33b in the tree structure construction unit 33 constructs tree structure data $NL_n$ representing large bronchi.

$$\theta_{i,i+1}(i,i+1) = f(D_{P_i,P_{i+1}}) \quad \text{[Formula 4]}$$

Figure 11:
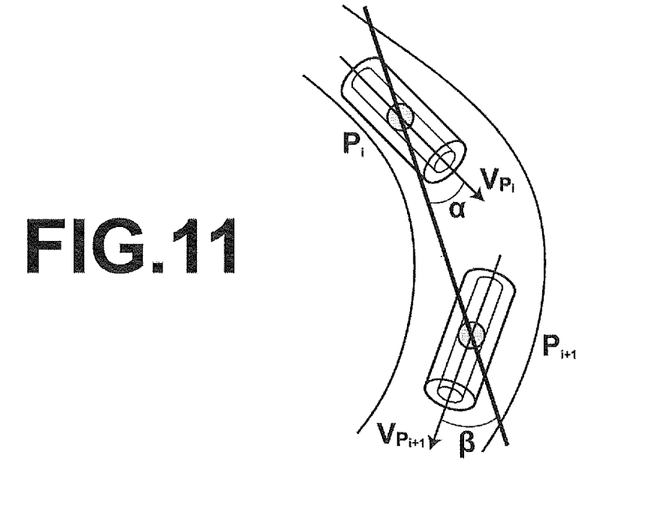
FIG. 11 is a diagram for explaining a second specific example of a method for calculating a cost between nodes.

A second specific example is a method for calculating a cost representing a change in a direction in which the bronchi run at each node point. As schematically illustrated in FIG. 11, the cost is calculated from the sum of angle α between a vector of the direction in which bronchi run at node point $P_i$ and straight line $P_iP_{i+1}$ and angle β between a vector of the direction in which bronchi run at node point $P_{i+1}$ and the straight line $P_iP_{i+1}$. The calculation is represented by the following formula. Here, as a vector of the direction in which bronchi run at node point $P_i$, $P_{i+1}$, an eigenvector corresponding to one of three eigenvalues that is closest to 0, which have been calculated by the Hessian matrix eigenvalue analysis units 32a, 34a, may be used. In other words, the principal axis direction vector of a linear structure extracted by the Hessian matrix eigenvalue analysis units 32a, 34a may be used. The principal axis direction vector should be stored in a predetermined memory area by the Hessian matrix eigenvalue analysis units 32a, 34a together with position information or the like of the point in the linear structure in such a manner to be related to each node point $NL_n$ of a tree structure representing large bronchi, or to each node point $EH_m$ representing a linear structure of small bronchi.

$$\theta_{i,i+1}(i, i+1) = f(\alpha, \beta) \quad \text{[Formula 5]}$$

$$\angle \alpha = \arccos \frac{V_{P_i} \cdot \overrightarrow{(P_{i+1}P_i)}}{\|V_{P_i}\| \cdot (P_{i+1} - P_i)}$$

$$\angle \beta = \arccos \frac{V_{P_{i+1}} \cdot (P_{i+1} - P_i)}{\|V_{P_{i+1}}\| \cdot (P_{i+1} - P_i)}$$

Figure 12:
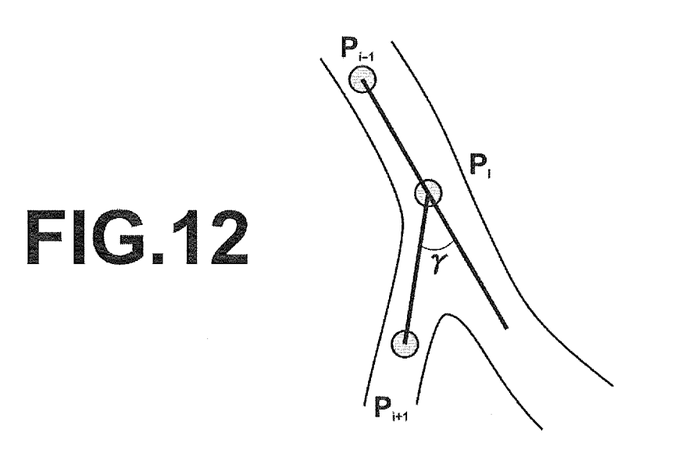
FIG. 12 is a diagram for explaining a third specific example of a method for calculating a cost between nodes.

A third specific example is also a method for calculating a cost representing a change in the direction in which bronchi run at each node point. As schematically illustrated in FIG.

12, in a state in which node point and node point $P_i$ have been already connected to each other, a cost is calculated based on angle γ between a vector from the node point $P_{i-1}$ to the node point $P_i$ and a vector from the node point $P_i$ to the node point $P_{i+1}$. The calculation is represented by the following formula:

$$\theta_{i,i+1}(i, i+1) = f(\gamma) \qquad \text{[Formula 6]}$$

$$\angle\gamma = \arccos\frac{\overrightarrow{(P_i - P_{i-1})}\overrightarrow{(P_{i+1} - P_i)}}{\|P_i - P_{i-1}\| \cdot \|P_{i+1} - P_i\|}$$

A fourth specific example is a method for calculating a cost representing a change in density values on a straight line connecting node point $P_i$ and node point $P_{i+1}$. Specifically, a cost is calculated based on change $G_{Pi,Pi+1}$ in density values in a segment between the node point $P_i$ and the node point $P_{i+1}$ by using the following formula:

$$\theta_{i,i+1}(i,i+1) = f(G_{Pi,Pi+1}) \qquad \text{[Formula 7]}$$

Here, specific examples of change $G_{Pi,Pi+1}$ in density values are as follows:

(1) The maximum value of the absolute value of a difference between each density value at plural points sampled from the segment between the node points $P_i$, $P_{i+1}$ and a representative value representing densities of the node points $P_i$, $P_{i+1}$ (an average of density values of the two points, or the like).

(2) A variance value of density values in the segment between the node points $P_i$, $P_{i+1}$.

(3) A difference value of density values in a sorted point string obtained by sorting sampling points in the segment between the node points $P_i$, $P_{i+1}$ (4) Test statistic $\tau_k$ as in the following formula is used to classify a sampling point set $(x_1, x_2, \ldots, x_k, \ldots, x_K)$ in the segment between node points $P_i$, $P_{i+1}$ as to whether any outlier is present in the sampling point set. The test statistic $\tau_k$ is a value obtained by dividing a deviation of density value $x_k$ at each sampling point from average density value μ in the sampling point set by unbiased standard deviation σ in the sampling point set.

$$\tau_k = \frac{x_k - \mu}{\sigma} \qquad \text{[Formula 8]}$$

(5) Smirnoff-Grubbs test (assuming a normal distribution) and Thompson test, which are used as outlier tests, are used.

Next, the tree structure reconstruction unit 35 performs weighting on three elements, i.e. a positional relationship between two node points to be connected to each other (a distance between node points), a change in vectors of the directions in which bronchi run at two node points, and a change in density values between two node points to be connected to each other, based on the kinds of node points to be connected. Further, the tree structure reconstruction unit 35 calculates a connection cost when two node points are connected to each other.

Specifically, when node points $NL_n$ of tree structure data representing large bronchi constructed from low resolution image VL are to be connected to each other, a connection cost is calculated by increasing the degree of weighting on a positional relationship between two node points. When node points $EH_m$ representing small bronchi constructed from high resolution image VH are to be connected to each other, a connection cost is calculated by increasing the degree of weighting on a change in the vectors of the directions in which bronchi run at the two node points (for details, please refer to Patent Document 1). Meanwhile, when each node point $NL_n$ of tree structure data representing large bronchi constructed from low resolution image VL and node point $EH_m$ representing small bronchi constructed from high resolution image VH are to be connected to each other, a connection cost is calculated by increasing the degree of weighting on a change in voxel values between the two node points.

Figure 13:
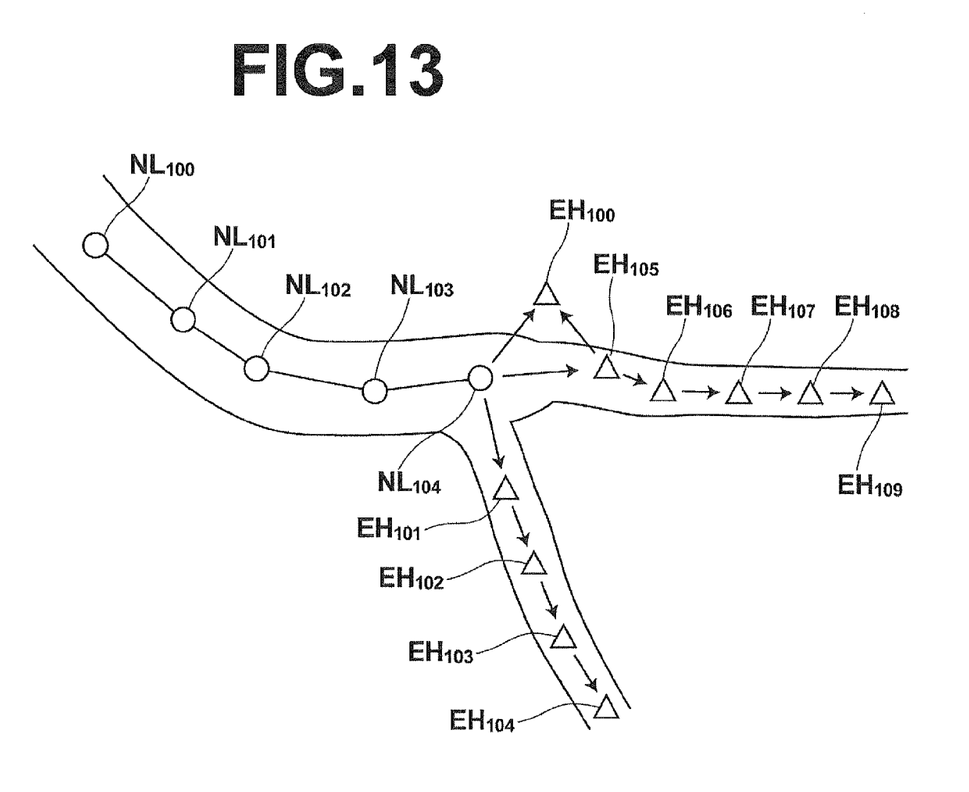
FIG. 13 is a schematic diagram illustrating the vicinity of a boundary between a large bronchus and small bronchi.

FIG. 13 is a schematic diagram illustrating the vicinity of a boundary between each node point $NL_n$ representing large bronchi and node point $EH_m$ representing small bronchi. In FIG. 13, the mark represents the former node point, and the mark Δ represents the latter node point. Further, a real wall of the bronchi is illustrated. In this example, connection from node point $NL_{100}$ through node point $NL_{104}$ is connection between node points representing large bronchi. Therefore, adjacent node points are connected to each other based on a connection cost obtained by increasing the degree of weighting on a positional relationship between each node point. Further, connection from node point $EH_{101}$ through node point $EH_{109}$ is connection between node points representing small bronchi. Therefore, node points $EH_{101}$ through $EH_{104}$, which run toward a lower right direction, are connected to each other based on a connection cost obtained by increasing the degree of weighting on a change, between nodes, in the vectors of the directions in which bronchi run. Here, the order of connection from the node point $EH_{101}$ to the node point $EH_{104}$ is based on a cost of the positional relationship of each node, and adjacent node points are connected to each other. Similarly, node points $EH_{105}$ through $EH_{109}$, which run toward the right side, are also sequentially connected. In contrast, the direction in which bronchi run at node point $EH_{100}$ is completely different from other node points $EH_{101}, \ldots, EH_{109}$, and a connection cost is higher than a predetermined threshold. Therefore, the node point $EH_{100}$ is not connected to these other node points $EH_{101}, \ldots, EH_{109}$.

In contrast, when node point $NL_{104}$ representing large bronchi and a node point representing small bronchi are connected to each other, a connection cost is calculated by increasing the degree of weighting on a change in density values between two node points to be connected to each other. Since the wall of the bronchi is not present between the node point $NL_{104}$ representing large bronchi and the node point $EH_{101}$ representing small bronchi, a change in density values between the node points is small. Therefore, the two nodes are connected to each other. Similarly, since the wall of the bronchi is not present between the node point $NL_{404}$ representing large bronchi and the node point $EH_{105}$ representing small bronchi, a change in density values between the node points is small. Therefore, the two node points are connected to each other. In contrast, the wall of the bronchi is present between the node point $NL_{104}$ representing large bronchi and the node point $EH_{100}$ representing small bronchi. Since a change in density values between the node points is large, the two node points are not connected to each other. Here, for example, node point $NL_{104}$ representing large bronchi and node point $EH_{102}$ representing small bronchi are not connected to each other, because a positional relationship between the node point $NL_{104}$ and the node point $EH_{102}$ is far, compared with a positional relationship between the node point $NL_{104}$ and the node point $EH_{101}$, and consequently, a connection cost of the former is larger than a connection cost of the latter.

As described above, node points $NL_{100}$ through $NL_{104}$ representing large bronchi, node point $NL_{104}$ representing large bronchi and node point $EH_{101}$ representing small bronchi, node point $NL_{104}$ representing large bronchi and node point $EH_{105}$ representing small bronchi, node points $EH_{101}$ through $EH_{104}$ representing small bronchi, and node points $EH_{105}$ through $EH_{109}$ representing small bronchi are correctly connected. Meanwhile, node point $EH_{100}$ is regarded as an erroneous extraction point, and not connected to any node point.

As described above, the tree structure reconstruction unit 35 may perform reconnection processing on all of node points $NL_n$ representing large bronchi and node points $EH_m$ representing small bronchi by using a minimum spanning tree algorithm. Alternatively, the tree structure reconstruction unit 35 may directly use the result of connection by the tree structure construction unit 33 for the node points $NL_n$ representing large bronchi. Consequently, it is possible to omit the repeated process, i.e., the process of connecting the nodes $NL_n$ representing large bronchi. Therefore, the processing efficiency is improved.

The bronchial region extraction unit 36 obtains a cross section orthogonal to the direction in which the bronchi run at each node of tree structure data T representing the reconstructed whole bronchi. Further, the bronchial region extraction unit 36 recognizes the contour of the bronchi at each cross section by using a known segmentation method, such as a graph-cut method, which has been described already, and relates information representing the contour to each node of the tree structure data T. Accordingly, bronchial region R is extracted.

As described above, according to the embodiments of the present invention, the continuous region extraction unit 32 and the tree structure construction unit 33 extract large bronchi by using a technique appropriate for the anatomical and image characteristics of the large diameter portion of the bronchi. Further, the linear structure extraction unit 34 extracts small bronchi by using a technique appropriate for the anatomical and image characteristics of the small diameter portion of the bronchi. When the tree structure reconstruction unit 35 connects node points representing large bronchi to each other, a connection cost is calculated based on a cost function that is defined in such a manner that the degree of weighting on a positional relationship between two node points is increased. When the tree structure reconstruction unit 35 connects node points representing small bronchi to each other, a connection cost is calculated based on a cost function that is defined in such a manner that the degree of weighting on a change in vectors of the directions in which bronchi run at two node points is increased. Accordingly, each node is appropriately connected based on a cost function calculated based on a cost function appropriate for an anatomical and image characteristic of each of a large diameter portion of the bronchi and a small diameter portion of the bronchi. Further, when a node point representing large bronchi and a node point representing a small node point are connected to each other, a connection cost is calculated by increasing the degree of weighting on a change in density values between the node points. Accordingly, it is possible to consider whether the wall of the bronchi is present between these node points. Therefore, large bronchi and small bronchi that have been extracted by using different techniques from each other are appropriately connected to each other.

As described above, it is possible to construct the whole tree structure representing the bronchi in a three-dimensional medical image at high accuracy.

The aforementioned embodiments are only examples, and none of the descriptions should be used to interpret the technical scope of the present invention in a limited manner. Further, the system configuration, the hardware configuration, the process flow, the module structure, the user interface, specific processing contents, and the like in the aforementioned embodiments may be modified in various manners without deviating from the gist of the present invention, and such modifications are still in the technical scope of the present invention.

For example, in the above embodiments, the bronchi of the human body are an extraction target. Alternatively, the present invention may be applied to extraction of a tubular structure having an anatomical and image characteristic similar to that of the bronchi.

In the aforementioned embodiments, the bronchi extraction technique of the present invention is packaged as a part of simulation and navigation functions of a surgery and an examination using a virtual endoscope image of bronchi. Alternatively, the present invention may be packaged as a bronchi analysis function for diagnosing a disease of lungs or bronchi, such as chronic obstructive pulmonary disease (COPD), based on an image. The bronchi analysis function can generate a CPR image of a part of bronchi specified by a user after the bronchi are automatically extracted from a three-dimensional medical image of the chest obtained by CT. Further, the bronchi analysis function can measure the diameter of the bronchi and the thickness of the wall of the bronchi.

Further, in the aforementioned embodiments, the multi-resolution image generation unit 31 is provided to reduce a process load and to increase the processing speed by extracting large bronchi from a low resolution image. Alternatively, large bronchi and small bronchi may be extracted from the original three-dimensional medical image without providing the multi-resolution image generation unit 31. In this case, for example, different sizes of filters should be used by the continuous region extraction unit 32 and by the linear structure extraction unit 34 when eigenvalue analysis of Hessian matrix is performed.

What is claimed is:

1. A medical image processing apparatus comprising:
a continuous region extraction unit that receives a three-dimensional medical image representing bronchi, and that extracts a continuous region having a voxel value corresponding to an air region in the bronchi;
a graph structure construction unit that constructs a graph structure corresponding to the continuous region;
a linear structure extraction unit that extracts a plurality of linear structures representing fragments of the bronchi by receiving the three-dimensional medical image, and by analyzing a local density structure in a neighborhood of each point in the three-dimensional medical image; and
a graph structure reconstruction unit that reconstructs a graph structure representing the bronchi by connecting a node constituting the graph structure corresponding to the continuous region and a node representing the linear structures to each other, and nodes representing the linear structures to each other by using a predetermined cost function,
wherein different cost functions are defined for a first segment connecting the node constituting the graph structure corresponding to the continuous region and the node representing the linear structures and a second segment connecting the nodes representing the linear structures to each other, and
wherein the cost function in the first segment is defined in such a manner that the first segment is more likely to be connected as a change in voxel values is smaller among first segments.

2. A medical image processing apparatus, as defined in claim 1, wherein the linear structure extraction unit extracts the linear structures, and calculates the principal axis directions of the linear structures, and wherein the cost function in the second segment is defined in such a manner that the second segment is more likely to be connected as a change in the principal axis directions at nodes located at both ends of the second segment is smaller.

3. A medical image processing apparatus, as defined in claim 1, the apparatus further comprising:

a multi-resolution image generation unit that generates a plurality of images having different resolutions from each other from the three-dimensional medical image, wherein the continuous region extraction unit receives a lower resolution image of the generated plurality of images, and extracts the continuous region from the lower resolution image, and wherein the linear structure extraction unit receives a higher resolution image of the generated plurality of images, and performs extraction of the linear structure and calculation of the principal axis direction on the higher resolution image.

4. A medical image processing apparatus, as defined in claim 1, wherein the continuous region extraction unit extracts the continuous region by using one of a graph-cut method, a region growing method, and a level set method.

5. A medical image processing apparatus, as defined in claim 1, wherein the linear structure extraction unit performs eigenvalue analysis of Hessian matrix with respect to each point in the three-dimensional medical image.

6. A medical image processing apparatus, as defined in claim 1, wherein the graph structure construction unit and the graph structure reconstruction unit construct graph structures by using a spanning tree algorithm.

7. A medical image processing method comprising the steps of:

receiving a three-dimensional medical image representing bronchi, and extracting a continuous region having a voxel value corresponding to an air region in the bronchi;

constructing a graph structure corresponding to the continuous region;

extracting a plurality of linear structures representing fragments of the bronchi by receiving the three-dimensional medical image, and by analyzing a local density structure in a neighborhood of each point in the three-dimensional medical image; and reconstructing a graph structure representing the bronchi by connecting a node constituting the graph structure corresponding to the continuous region and a node representing the linear structures to each other, and nodes representing the linear structures to each other by using a predetermined cost function, wherein different cost functions are defined for a first segment connecting the node constituting the graph structure corresponding to the continuous region and the node representing the linear structures and a second segment connecting the nodes representing the linear structures to each other, and wherein the cost function in the first segment is defined in such a manner that the first segment is more likely to be connected as a change in voxel values is smaller among first segments.

8. A non-transitory computer-readable recording medium storing therein a medical image processing program for causing a computer to execute the steps of:

receiving a three-dimensional medical image representing bronchi, and extracting a continuous region having a voxel value corresponding to an air region in the bronchi;

constructing a graph structure corresponding to the continuous region;

extracting a plurality of linear structures representing fragments of the bronchi by receiving the three-dimensional medical image, and by analyzing a local density structure in a neighborhood of each point in the three-dimensional medical image; and reconstructing a graph structure representing the bronchi by connecting a node constituting the graph structure corresponding to the continuous region and a node representing the linear structures to each other, and nodes representing the linear structures to each other by using a predetermined cost function, wherein different cost functions are defined for a first segment connecting the node constituting the graph structure corresponding to the continuous region and the node representing the linear structures and a second segment connecting the nodes representing the linear structures to each other, and wherein the cost function in the first segment is defined in such a manner that the first segment is more likely to be connected as a change in voxel values is smaller among first segments.

* * * * *